United States Patent
Eberhardt

(10) Patent No.: US 11,543,106 B2
(45) Date of Patent: Jan. 3, 2023

(54) BUILT-IN LIGHT AND/OR CAMERA

(71) Applicant: HERBERT WALDMANN GMBH & CO. KG, Villingen-Schwenningen (DE)

(72) Inventor: Marcus Eberhardt, Aixheim (DE)

(73) Assignee: HERBERT WALDMANN GMBH & CO. KG, Villingen-Schwenningen (DE)

( * ) Notice: Subject to any disclaimer, the term of this patent is extended or adjusted under 35 U.S.C. 154(b) by 0 days.

(21) Appl. No.: 17/359,972

(22) Filed: Jun. 28, 2021

(65) Prior Publication Data

US 2021/0404639 A1 Dec. 30, 2021

(30) Foreign Application Priority Data

Jun. 29, 2020 (DE) .......................... 102020117066.1

(51) Int. Cl.
| | |
|---|---|
| *F21V 21/04* | (2006.01) |
| *F21V 21/13* | (2006.01) |
| *H04N 5/225* | (2006.01) |
| *F21Y 115/10* | (2016.01) |

(52) U.S. Cl.
CPC .......... *F21V 21/049* (2013.01); *F21V 21/044* (2013.01); *F21V 21/13* (2013.01); *H04N 5/2257* (2013.01); *F21Y 2115/10* (2016.08)

(58) Field of Classification Search
CPC ...... F21V 21/049; F21V 21/044; F21V 21/02; F21V 21/13; F21V 33/0052; F21Y 2115/10; F21W 2131/403; H04N 5/2257
See application file for complete search history.

(56) References Cited

U.S. PATENT DOCUMENTS

| | | | | |
|---|---|---|---|---|
| 10,066,807 | B2 * | 9/2018 | Clauss | ........................ F21V 5/02 |
| 2005/0225966 | A1 * | 10/2005 | Hartmann | ............... F21S 8/024 |
| | | | | 362/147 |
| 2017/0370532 | A1 * | 12/2017 | Ma | ............................ F21K 9/27 |
| 2019/0253670 | A1 * | 8/2019 | Chien | .................. H04N 5/2256 |

FOREIGN PATENT DOCUMENTS

| | | |
|---|---|---|
| CN | 107426363 A | 12/2017 |
| CN | 107702420 A | 2/2018 |
| CN | 208794349 U | 4/2019 |
| DE | 202013100577 U1 | 6/2014 |
| EP | 3336421 * | 2/2020 ............. F21V 21/04 |
| JP | S49135281 U | 11/1974 |
| KR | 102078681 B1 | 2/2020 |

OTHER PUBLICATIONS

Search report dated Nov. 5, 2021, in parallel European application No. 21 137 996.6.

* cited by examiner

*Primary Examiner* — Peggy A Neils
(74) *Attorney, Agent, or Firm* — Nath, Goldberg & Meyer; Jerald L. Meyer; Stanley N. Protigal

(57) ABSTRACT

The present invention relates to a built-in light and/or camera (1) for arrangement in an installation opening (4) of a wall (5), in particular an inner wall of a machine, having a housing (10) with a front side area (12), a rear side area (14) and side walls (15, 16, 17, 18), wherein at least one camera (30) and/or at least one light source (40) is arranged in the front side area (12), wherein a stop (20) is arranged in the front side area (12), wherein at least one fastening (50) is provided that protrudes over one of the side walls (15, 16, 17, 18), and wherein the at least one fastening (50) is configured to form a spring-loaded form fit of the wall (5) between the stop (20) and the at least one fastening (50) like a trap when inserted into the installation opening (4).

15 Claims, 3 Drawing Sheets

BUILT-IN LIGHT AND/OR CAMERA

FIELD

The present invention relates to a built-in light and/or camera for arrangement in an installation opening in a wall of a machine, and having, at least one fastening.

BACKGROUND

Built-in lights and/or cameras are previously known from prior art in different configurations. Generic built-in lights and/or cameras are used in prior art to illuminate an interior of a machine in order to be able to observe the machine during a manufacturing process. The requirements for such built-in lights and/or cameras are high, since they should have a high power density on the one hand and must withstand the conditions in the interior of the machine on the other hand. The production process within the machine can be observed directly through an optical access in the wall of the machine or directly via a camera, which records what is happening inside the machine either by analog means or digitally.

Such lights and/or cameras have proven successful in the past, but it has turned out to be a disadvantage that the fastenings used for the built-in lights and/or cameras require time-consuming assembly and disassembly for maintenance and, on the other hand, that the fastenings used for the built-in light and/or camera lead to accumulations of contamination. Vibrations can cause a disconnecting or loosening of the fastenings used and gaps and pockets provide space for the accumulation of germs, which means that use in the food industry is not possible.

SUMMARY

This is where the present invention starts.

The present invention is based on the object of appropriately improving the built-in lights and/or cameras known from prior art for arrangement in an installation opening in a wall, in particular an interior wall of a process chamber of a machine, and eliminating the disadvantages known from prior art. The built-in light and/or camera should be able to be fastened without tools in the interior of a machine and be held securely by fastening even in the event of vibrations and shocks. Furthermore, a currentless fastening should be made possible, and the fastening should be able to compensate for tolerances of the wall and the installation opening.

These objects are achieved by a built-in light and/or camera for arrangement in an installation opening in a wall, in particular an inner wall of a machine, with the features of a housing with a front side area, a rear side area and side walls. At least one camera and/or at least one light source is arranged in the front side area, and a stop is arranged in the front side area. At least one fastening is provided that protrudes over one of the side walls, and is configured to form a spring-loaded form fit of the wall between the stop and the one fastening. The spring, when inserted into the installation opening, has a trap configuration.

The built-in light and/or camera according to the invention for arrangement in an installation opening of a wall, in particular an inner wall of a machine, with the features of claim 1, has a housing with a front side area, a rear side area and several side walls, with at least one light source and/or a camera arranged in the front side area, wherein a stop is arranged in the front side area, which is configured to lie against the wall adjacent to the installation opening, wherein at least one fastening is provided that protrudes over one of the side walls, and wherein the at least one fastening is configured, when inserted into the installation opening, to clamp the wall like a trap in a spring-loaded form fit of the wall between the at least one fastening and the stop.

The present invention is based on the idea of enabling tool-free installation of the built-in light and/or camera, wherein the at least one fastening initially recedes elastically as a result of elastic deformation when inserted into the installation opening of the wall and thus allows insertion into the installation opening, whereafter the same engages behind the wall like a trap to form a form fit and presses the stop against the wall in a spring-tensioned way. A potential gap between the stop and the wall can also be closed or sealed by the spring tension and the built-in light and/or camera can be centered in the installation opening. Due to the spring-loaded form fit according to the invention, the built-in light and/or camera can also be used for walls with different wall thicknesses, since the at least one fastening tolerates a wide range of wall thicknesses and greater differences in the thickness of the wall due to its shape. Thanks to the screwless design, the built-in light and/or camera can be used in the food industry. Furthermore, the present invention is based on the idea of proposing a fastening concept for the built-in light and/or camera that is completely covered, so that no chips or dirt particles can be deposited.

A preferred development of the present invention provides that the at least one fastening is arranged between the front side area and the rear side area on one of the side walls. The at least one fastening is preferably arranged exclusively in the area of the relevant side wall and neither projects from nor overlaps a rear side formed in the rear side area nor a front side formed in the front side area. As a result, a particularly compact design can be implemented and an attractive design of the built-in light and/or camera can also be possible.

According to a further aspect of the present invention, the at least one fastening protrudes in a V or U shape over one of the side walls. The at least one fastening can be designed in the manner of a latch beveled on one or both sides, a first beveled flank facing the rear-side section and a second beveled flank facing the front-side section. The first beveled flank and the second beveled flank meet at a dome, the dome being located furthest from the side wall. When inserting the built-in light and/or camera, the relevant at least one fastening is pressed in via the first beveled flank in such a way that the dome is passed through the installation opening. The spring force of the V- or U-shaped fastening then presses the housing into the installation opening in a spring-loaded way until the stop rests against the wall. The distance between the dome and the side wall is smaller than a distance between a free end of the flange and the side wall.

A further advantageous embodiment of the present invention provides that the at least one fastening comprises at least one leg spring section with a first leg and a second leg. Preferably, the second leg is V-shaped or U-shaped and protrudes beyond one of the side walls, whilst the first leg can be fixed to the housing. The second leg is preferably arranged along a vertical axis and can be V-shaped or U-shaped, the vertical axis preferably corresponding to the normal vector of a front side arranged in the front side area.

Furthermore, it has proven to be advantageous if the at least one leg spring section has a helical spring section with a winding direction. The helical spring section preferably has a plurality of windings, with the helical spring section preferably being elastically loaded counter to the winding direction when the built-in light and/or camera is/are inserted.

According to a further advantageous embodiment of the present invention, the at least one fastening has two leg spring sections which are connected by a bracket section. Thanks to the bracket section, the second legs can be arranged parallel and spaced apart on the relevant side wall of the housing. The two leg spring sections pull the stop of the built-in light and/or camera in an even and distributed way against the wall.

According to a further advantageous embodiment of the present invention, the leg spring section and the bracket section are connected to one another and the bracket section is arranged at an angle to the leg spring section. In a further development of the invention, the bracket section can be arranged perpendicular to the leg spring section and can furthermore rest at least in sections on the relevant side wall. When the at least one fastening is pressed in on the side wall, the fastening can preferably perform an evasive movement.

A further development of the present invention provides that the bracket section is pressed against the relevant side wall. In particular, it is preferred if the bracket section is pressed against the relevant side wall counter to the particular winding direction of the leg spring section, wherein the at least one fastening is preferably held on the housing by clamping between the first leg and the bracket section.

According to a further advantageous embodiment of the present invention, the at least one fastening is inserted in some areas in a cut-out in the side wall of the housing. The cut-out is preferably incorporated or molded into the relevant outer wall at a distance from the front side section and the rear side section and corresponds to the shape of the at least one fastening. In particular, it is preferred if at least the helical spring section of the leg spring section is arranged within the cut-out and only the second, preferably V-shaped or U-shaped, leg protrudes from the cut-out and engages over the relevant side wall. In the event that several fastenings are provided, also on different side walls of the built-in light and/or camera, it is preferred if a cut-out is provided for each of the fastenings. It is also conceivable that two cutouts are provided for each fastening. Such a configuration can be advantageous if the at least one fastening has two leg spring sections and a bracket section and a cut-out is provided for each of the leg spring sections.

A further development of the present invention provides that the cut-out has at least one undercut, and that the at least one fastening can be fastened in the cut-out by means of a form fit. In particular, it is preferred if at least the free end of the first leg of the leg spring section engages the undercut.

Furthermore, it is advantageous if the at least one undercut is formed by a recess, which connects the rear side area to the cut-out. The recess can consequently be incorporated or molded in from the rear side area, which results in a particularly simple production of the undercut in the cut-out.

Furthermore, it has proven to be advantageous if the stop is designed as a circumferential flange in the front side area. The circumferential flange can have sealing means on the side facing the rear side area, by means of which the sealing effect between the stop and the wall is increased in the installed state of the built-in light and/or camera. The sealing means can for example comprise a foam rubber ring, a sealing ring, a rubber sealing lip, a foamed plastic or the like and can be arranged or fastened within a groove on the side of the circumferential flange facing the rear side area. In particular, it can be advantageous if the sealing means is an O-ring and if a groove, in particular a trapezoidal groove, is formed on the side of the stop facing the rear side area, into which groove the sealing means described above can be inserted.

In addition, in a further development of the present invention, it has proven to be advantageous if a recess adapted to the fastening is arranged on the side of the circumferential flange facing the rear side area. The adapted recess can advantageously be configured to at least partially accommodate the at least one fastening during the evasive movement of the relevant at least one fastening, as a result of which the design of the present and inventive built-in light and/or camera is particularly compact.

According to a preferred development, a dismantling slot is arranged on the side of the stop facing the rear side area, which makes it possible to detach the built-in light and/or camera from the wall. In particular, it is preferred if the dismantling slot can accommodate a tool by means of which the built-in light and/or camera can be dismantled by a lever movement.

A further development of the present invention provides that the at least one light source is provided in the housing, and that a housing opening is provided in the front side area, through which the light emitted by the at least one light source can exit the housing. The at least one housing opening is preferably formed in a plane on a front side, the housing opening preferably being tightly closed by a transparent plate. The at least one light source can preferably be an LED light source. In addition, it has proven to be advantageous if a plurality of light sources are provided in a grid and are arranged in a light source plane parallel to and spaced from the front side. In particular, it is preferred if the light sources are movably arranged in the light source plane parallel to the front side in the housing and the light sources can be moved in the light source plane by suitable adjustment means.

In addition, it is advantageous if the transparent plate for the at least one light source has an optical section in each case in the housing opening. The optical section is configured for the relevant light source to specify the distribution of the light emitted through the housing opening and to be able to set a main beam angle of ±45°. A built-in light configured in this way consequently no longer has to be pivoted on the wall in order to direct the light onto the location to be illuminated.

In addition, it is advantageous if the at least one camera is arranged in or within the housing opening. In a preferred development, the camera can be surrounded by light sources in the light source plane. The object observed by the camera can be illuminated in the best possible way by the light source and unrestricted observation of the manufacturing process in the machine is possible by means of the camera.

BRIEF DESCRIPTION OF THE DRAWINGS

An exemplary embodiment of a built-in light and/or camera according to the invention is described in detail below with reference to the accompanying drawings. In the drawings.

DETAILED DESCRIPTION

In the following, identical or functionally identical components in an exemplary embodiment are identified by the same reference symbols. For the sake of clarity, not all parts that are the same or functionally the same in the individual figures are provided with a reference number.

Figure 1:
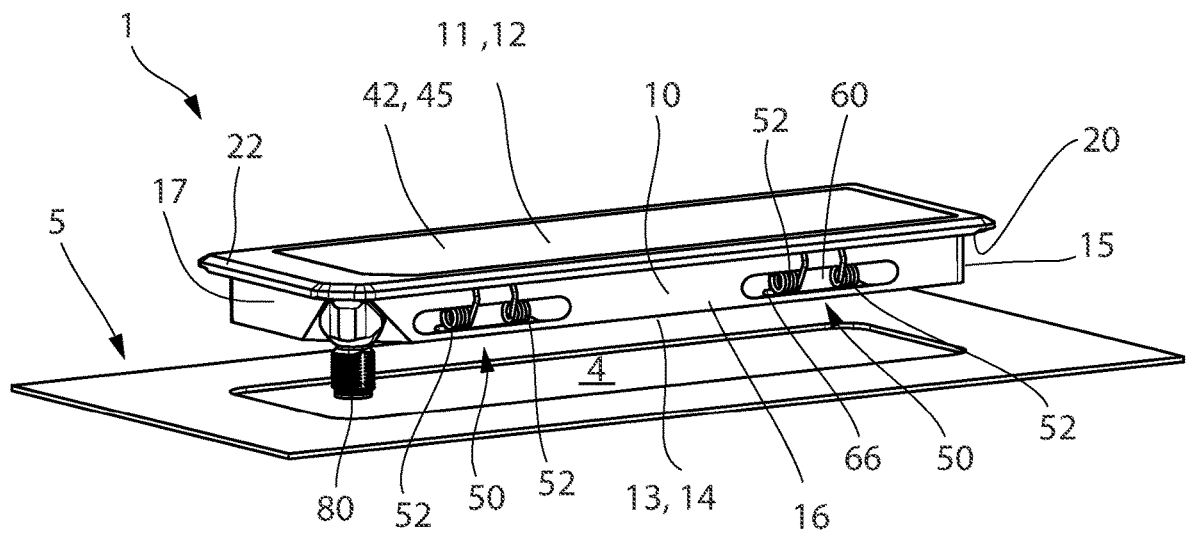
FIG. 1 is a simplified perspective exploded view of a built-in light and a wall with an installation opening, into which the built-in light can be inserted and fixed by means of fastenings.

The exploded view according to FIG. 1 shows a built-in light and/or camera 1 which is configured to be inserted into a receiving opening 4 of a wall 5. The wall 5 can be an inner wall of a machine (not shown), which encloses a process chamber in which the machining of workpieces can take place, at least in some areas. Such walls 5 can be formed from a planar material with a wall thickness t, wherein the material is typically a metallic material. The wall 5 has a first side and a second side opposite the first side, the first side of the wall 5 facing the process chamber.

The receiving opening 4 can be designed in the shape of a cuboid, and the edges can be rounded. The installation opening 4 has a width B3 and a length L2.

For the sake of simplicity, the built-in light and/or camera 1 is first described in the configuration as a pure built-in light 1 and also designated as such.

Figure 3:
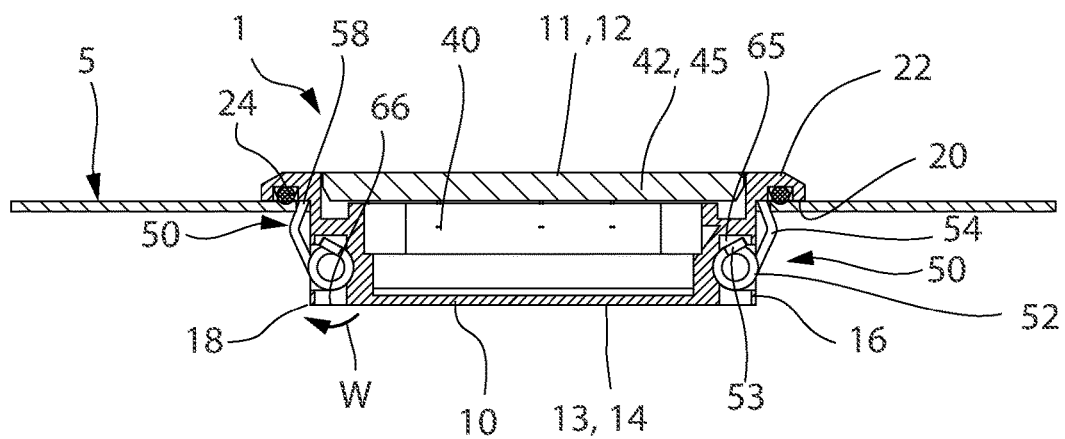
FIG. 3 shows a sectional view of the built-in light and the wall, the built-in light being inserted into the installation opening.

The built-in light 1 comprises a housing 10 with a front side area 11 and a rear side area 13, wherein the rear side area 13 is able to protrude through the installation opening 4. The rear side area 13 has a rear side 14 and the front side area 11 has a front side 12, wherein the front side 12 is arranged on the first side of the wall 5 and the rear side 14 on the opposite second side of the wall 5 when the built-in light 1 according to FIG. 3 is in the inserted state.

The housing 10 is preferably cuboid and, as shown, can have four side walls 15, 16, 17, 18, the housing 10 having a width B1, a length L1 and a height H1. On the front side area 11, the housing 10 has a preferably circumferential flange 22, which protrudes from the side walls 15, 16, 17, 18 and forms a stop 20. As can be seen from FIG. 4, the built-in light 1 has a width B2 and a length L2 measured with the stop 20 in the front side area 11, the width B2 being greater than the width B1 and the length L2 being greater than the length L1. The stop 20 specifies how far the housing 10 can penetrate through the installation opening 4 into the wall 5.

One or more light sources 40 can be arranged in the housing 10, wherein the light sources 40 are preferably LED light sources, which are arranged on one or more plates, preferably in a grid. In addition, the housing 10 has a housing opening 42 in the front side area, through which the light emitted by the light source 40 can be emitted. The housing opening 42 can be closed by a plate 45 in the front side area 11, the plate 45 preferably being a transparent plate 45.

In order to fasten the built-in light 1 or the built-in light and/or camera 1 in the installation opening 4, several fastenings 50 are provided, which protrude from the side walls 16, 18. In a preferred embodiment, at least one fastening 50 is arranged on opposite side walls 15, 16, 17, 18, that is to say on side walls 16, 18 and/or on side walls 15 and 17.

The fastenings 50 are inserted into a cut-out 60 in the relevant side wall 15, 16, 17, 18, and protrude from the cut-out 60 over the relevant side wall 15, 16, 17, 18.

The cut-out 60 can be incorporated or molded into the side wall 15, 16, 17, 18 of the housing 10 as a semicircular groove, for example by means of a fillet milling or a plate milling, and can continue to run out in a longitudinal direction. The semicircular groove has a diameter D2, wherein the depth of the semicircular groove is preferably greater than ½ D2 and less than D2.

Undercuts 65, which preferably face the front side area 11 and/or the rear side area 14, can be formed in the cut-out 60. Each undercut 65 can—as can be seen from FIGS. 2-4—be formed by a recess 66, which is incorporated or molded into the housing 10 from the rear side area or the rear side 13 and connects the rear side 13 to the cut-out 60.

The fastening 50 protrudes from the cut-out 60 and, adjacent to the cut-out 60, projects beyond the relevant side wall 15, 16, 17, 18 in a V or U shape with two flanks which meet in a dome. By means of two flanks, the fastening 50 can make an elastic evasive movement in the manner of a door latch when the built-in light and/or camera 1 is inserted. In this case, the fastening 50 is pressed elastically in the direction of the relevant side wall 15, 16, 17, 18 via a first flank. As soon as the dome has passed the installation opening 4 of the wall, the fastening 50 springs back and presses the wall 5 with the second flank into a spring-loaded form fit, whereby the wall 5 is clamped between the stop 20 and the fastening 50. The built-in light and/or camera can be pulled into the wall 5 via the fastening 50 and is automatically centered in relation to the installation opening 6. The dome protrudes at a distance from the relevant side wall 15, 16, 17, 18 and the width B1 or the length L1 and twice the distance of the dome is greater than a width or length of the installation opening 6. However, the width B1 or the length L1 and twice the distance between the dome and the relevant side wall 15, 16, 17, 18 are smaller than the width B2 and the length L2. The dome preferably protrudes approximately 3 mm to 10 mm, preferably approximately 5 mm, from that of the relevant side wall 15, 16, 17, 18.

As shown in FIGS. 1-5, the fastening 50 can have two leg spring sections 52 and a bracket section 58. The two leg spring sections 52 are arranged at a distance from one another and are connected to one another via the bracket section 58. The bracket section 58 is oriented substantially in the longitudinal direction.

The leg spring section 52 has a first leg 53 and a second leg 54, wherein it is possible for a helical spring section having a winding direction W to be arranged between the first leg 53 and the second leg 54. The first leg 53 forms a free end, whilst the second leg 54 is connected to the bracket section 58.

The helical spring section of the leg spring section 52 has a diameter D1, the diameter D1 roughly corresponding to the diameter D2 of the semicircular groove or cut-out 60.

Figure 2:
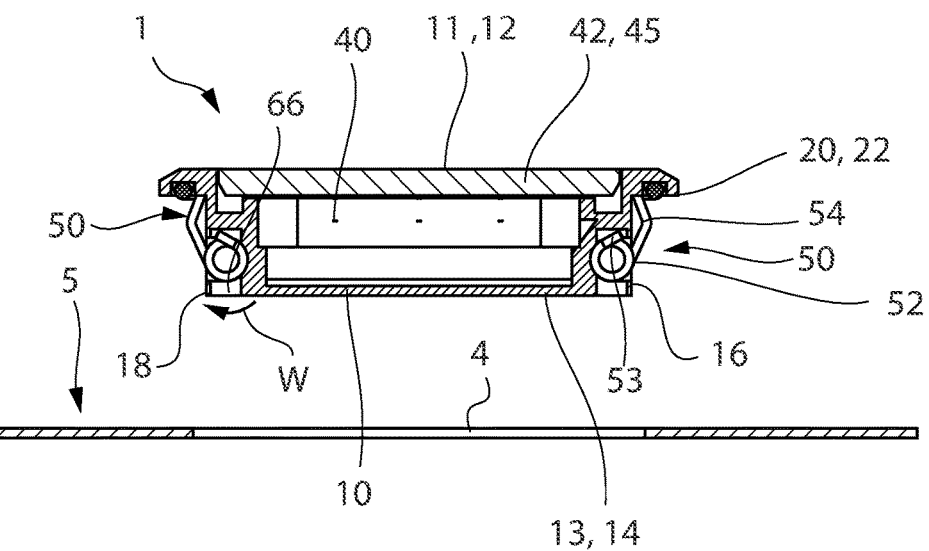
FIG. 2 shows a sectional view of the built-in light and the wall according to FIG. 1.

The first leg 53 protrudes from the helical spring section and engages in the undercut 65 in the cut-out 60, as shown in FIGS. 2 and 3.

The second leg 54 is V-shaped and forms the first flank, the second flank and the dome of the fastening 50. The second leg 54 protrudes inclined from the cut-out 60 and projects beyond the relevant side wall 15, 16, 17, 18 in such a way that the dome is arranged in the direction of the front side area 11 beyond the cut-out 60. The bracket section 58 is pressed by the elastic spring force in the winding direction W against the relevant side wall 15, 16, 17, 18.

The bracket section 58 is arranged at an angle to the second leg 54 and rests on the relevant side wall 15, 16, 17, 18. In addition, the bracket section 58 can rest against the stop 20 or the flange 22, wherein a recess 23 adapted to the bracket section 58 is preferably incorporated or molded into the flange 22 and accommodates the bracket section 58. The bracket section 58 can be pressed against the stop 20 by the spring force of the fastening 50.

Due to the form fit of the first leg 53 in the undercut 65 and/or the form fit of the bracket section 58 in the recess 23, the fastening 50 can be clipped into the cut-out 60 and is held there in a loss-proof manner.

Figure 4:
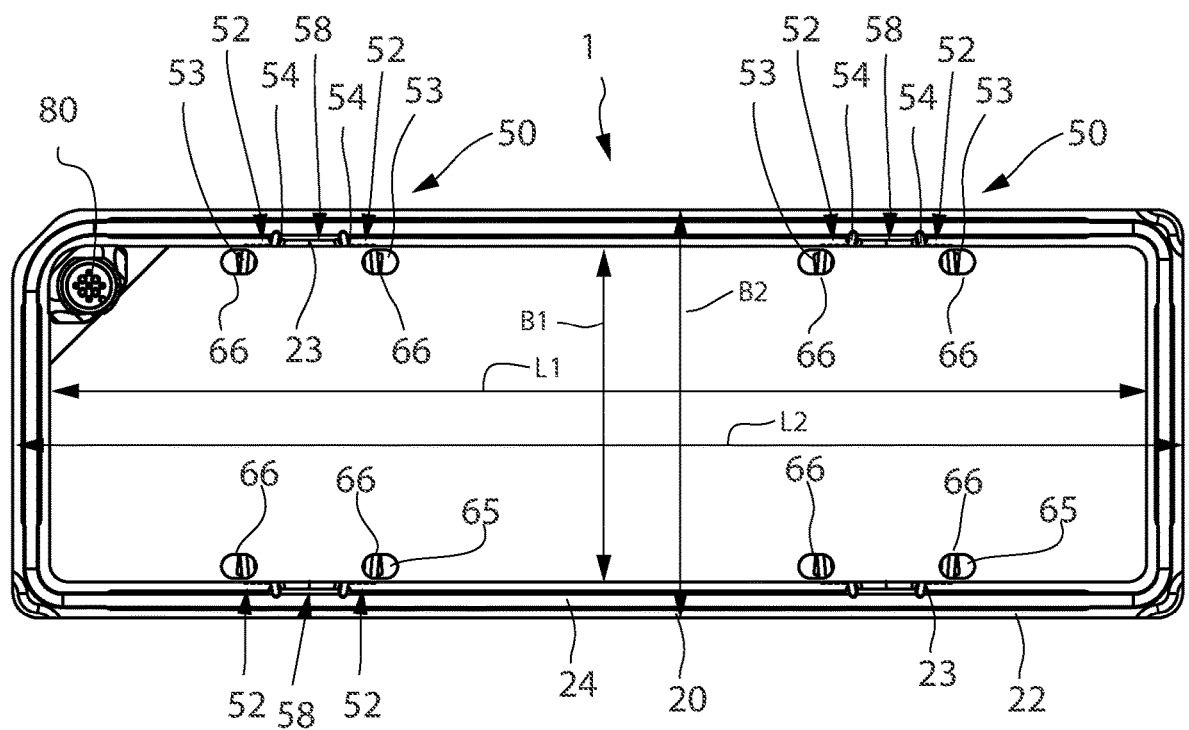
FIG. 4 shows a plan view of the rear of the built-in light according to FIGS. 1-4.

With reference to FIG. 4, it can be seen that the built-in light 1 and/or camera has an electrical connection 80, wherein the electrical connection is arranged on a surface 85 inclined by 45° to the rear side 14 on an edge between two side walls 15, 16, 17, 18. The electrical connection 80 is rotatably arranged on the inclined surface 85, wherein the electrical connection 80 is preferably rotatable through 180° on the inclined surface 85.

The electrical connection can be single-pole or multi-pole and serves, on the one hand, to supply current to the built-in light and/or camera 1 and/or to exchange data.

Figure 5:
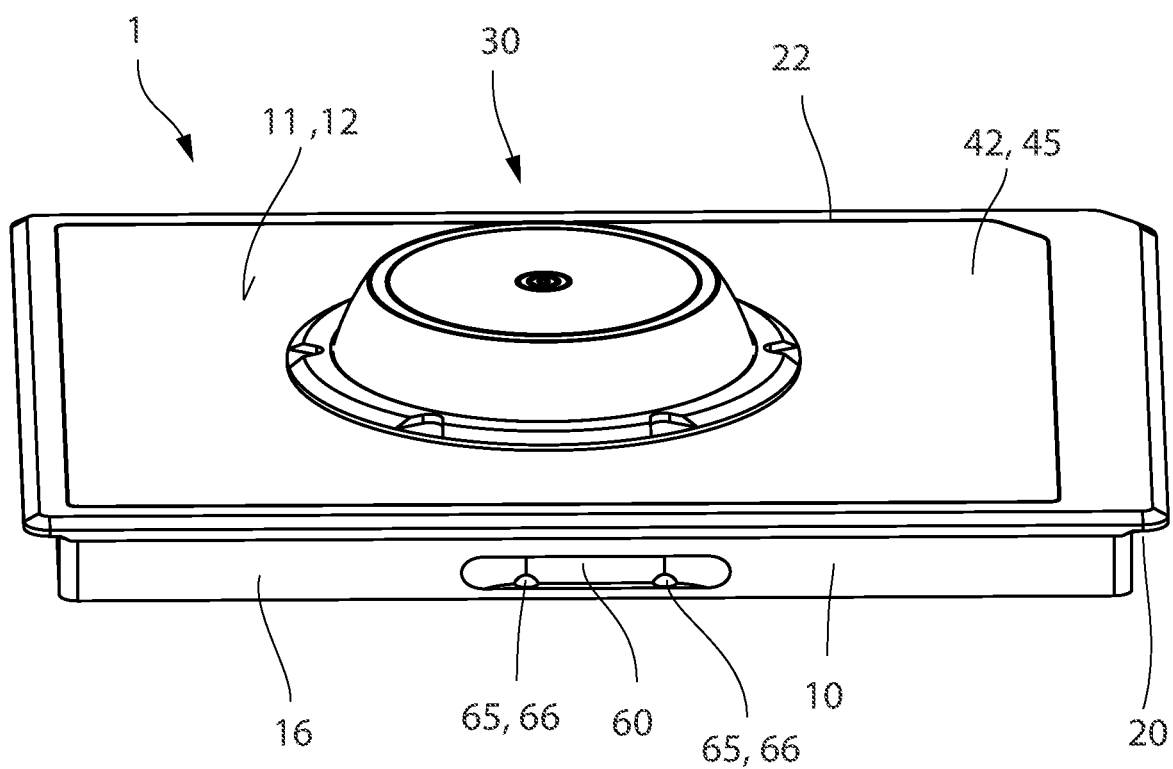
FIG. 5 shows a further development of the built-in light according to FIGS. 1-4, the built-in light having a camera.

As can be seen from the further development according to FIG. 5, a camera 30 which is inserted into the housing opening 42 can also be provided. The camera 30 can—as shown in FIG. 5—be arranged in the housing opening 42 in such a way that the camera 30 is surrounded by light sources 40 in the front side area. This configuration corresponds to a combination of a built-in light and camera 1, wherein the fastening 50 is not shown in this illustration. Alternatively, in a further development, not shown, the housing 10 can accommodate at least one camera 30 and have no light sources 40, wherein this configuration corresponds to a built-in camera 1.

LIST OF REFERENCE NUMERALS

1 Built-in light and/or camera
4 Installation opening
5 Wall
10 Housing
11 Front side
12 Front side area
13 Rear side
14 Rear side area
15 Side wall
16 Side wall
17 Side wall
18 Side wall
20 Stop
22 Flange
30 Camera
40 Light source
42 Housing opening
45 Plate
50 Fastening
52 Leg spring section
53 First leg
54 Second leg
58 Bracket section
60 Cut-out
65 Recess
B Width
H Height
L Length
W Winding direction

The invention claimed is:
1. A built-in light and/or camera (1) for arrangement in an installation opening (4) of a wall (5), comprising:
a housing (10) with a front side area (12), a rear side area (14) and side walls (15, 16, 17, 18),
wherein at least one camera (30) and/or at least one light source (40) are arranged in the front side area (12),
wherein a stop (20) is arranged in the front side area (12),
wherein at least one fastening (50) is provided that protrudes over one of the side walls (15, 16, 17, 18),
wherein the at least one fastening (50) is configured to form a spring-loaded form fit of the wall (5) between the stop (20) and the at least one fastening (50), providing a trap function when inserted into the installation opening (4),
wherein the at least one fastening (50) comprises at least one leg spring section (52) with a first leg (53) and a second leg (54),
wherein the second leg (54) protrudes in a V or U shape over one of the side walls (15, 16, 17, 18) forming a first flank, a second flank and a dome in the manner of a latch beveled on both sides,
wherein the dome is located furthest from the side wall (15, 16, 17, 18),
and wherein the first flank facing the rear-side section and a second flank facing the front-side section.

2. The built-in light and/or camera (1) according to claim 1, characterized in that the at least one fastening (50) is arranged between the front side area (12) and the rear side area (14).

3. The built-in light and/or camera (1) according to claim 1, characterized in that the at least one leg spring section (52) has a helical spring section (55) with a winding direction (W).

4. The built-in light and/or camera (1) according to claim 1, characterized in that two leg spring sections (52) are provided, which are connected by a bracket section (58).

5. The built-in light and/or camera (1) according to claim 1, characterized in that the bracket section (58) is arranged at an angle to the leg spring section (52) and that the bracket section (58) lies against the relevant side wall (15, 16, 17, 18).

6. The built-in light and/or camera (1) according to claim 4, characterized in that the bracket section (58) is pressed against the relevant side wall (15, 16, 17, 18).

7. The built-in light and/or camera (1) according to claim 1, characterized in that the at least one fastening (50) is inserted in some areas into a cut-out (60) in the side wall (15, 16, 17, 18) of the housing (10).

8. The built-in light and/or camera (1) according to claim 7, characterized in that the cut-out (60) has at least one undercut (65), and that the fastening (50) can be fastened in the cut-out (60) by means of a form fit.

9. The built-in light and/or camera (1) according claim 8, characterized in that the at least one undercut (65) is formed by a recess (66) which connects the rear side area (14) to the one cut-out (60).

10. The built-in light and/or camera (1) according to claim 1, characterized in that the stop (20) is designed as a circumferential flange (22) in the front side area (12).

11. The built-in light and/or camera (1) according to claim 1, characterized in that a recess (23) adapted to the fastening (50) is positioned on the side of the circumferential flange (22) facing the rear side area.

12. The built-in light and/or camera (1) according to claim 1, characterized in that the at least one light source (40) is provided in the housing (10) and that a housing opening (42) is provided on a front side (11), from which the light emitted by the light source (40) can exit the housing (10).

13. The built-in light and/or camera (1) according to claim 1, characterized in that a transparent plate (45) is arranged in the housing opening (42) and has an optical section for the at least one light source (40).

14. The built-in light and/or camera (1) according to claim 1, characterized in that the camera (30) is arranged in the housing opening (42).

15. A built-in light and/or camera (1) for arrangement in an installation opening (4) of an inner wall (5) of a machine, comprising:

- a housing (10) with a front side area (12), a rear side area (14) and side walls (15, 16, 17, 18),
- wherein at least one camera (30) and/or at least one light source (40) are arranged in the front side area (12),
- wherein a stop (20) is arranged in the front side area (12),
- wherein at least one fastening (50) is provided that protrudes over one of the side walls (15, 16, 17, 18),
- wherein the at least one fastening (50) is configured to form a spring-loaded form fit of the wall (5) between the stop (20) and the at least one fastening (50), providing a trap function when inserted into the installation opening (4),
- wherein the at least one fastening (50) comprises at least one leg spring section (52) with a first leg (53) and a second leg (54),
- wherein the second leg (54) protrudes in a V or U shape over one of the side walls (15, 16, 17, 18) forming a first flank, a second flank and a dome in the manner of a latch beveled on both sides,
- wherein the dome is located furthest from the side wall (15, 16, 17, 18),
- and wherein the first flank facing the rear-side section and a second flank facing the front-side section.

* * * * *